United States Patent [19]

Whyte et al.

[11] 4,199,761
[45] Apr. 22, 1980

[54] MULTICHANNEL RADIO COMMUNICATION SYSTEM FOR AUTOMATED POWER LINE DISTRIBUTION NETWORKS

[75] Inventors: Ian A. Whyte, Churchill Borough, Pa.; Richard F. Cook, Raleigh, N.C.

[73] Assignee: Westinghouse Electric Corp., Pittsburgh, Pa.

[21] Appl. No.: 930,294

[22] Filed: Aug. 2, 1978

[51] Int. Cl.² .................................................. H04B 7/00
[52] U.S. Cl. .................................... 340/695; 340/310 R;
340/310 A; 179/1 GB; 179/2 E; 455/38;
455/39; 455/42; 455/68
[58] Field of Search ............ 343/225, 226; 179/1 GB,
179/1 GD, 2 E; 325/39, 47, 48, 54, 3, 9–11, 36,
37, 392; 340/310 R, 310 A

[56] References Cited
U.S. PATENT DOCUMENTS

| | | | |
|---|---|---|---|
| 3,454,927 | 7/1969 | Dame et al. | 343/225 |
| 3,534,266 | 10/1970 | Halstead | 325/48 |
| 3,656,112 | 4/1972 | Pauli | 340/151 |
| 3,659,280 | 4/1972 | Donohoo | 340/310 R |
| 3,705,385 | 12/1972 | Batz | 340/152 R |
| 3,711,856 | 1/1973 | Adrian et al. | 325/9 |
| 3,714,375 | 1/1973 | Stover | 179/2 E |
| 3,715,723 | 2/1973 | Fletcher et al. | 340/163 |
| 3,815,119 | 6/1974 | Finlay, Jr. et al. | 340/310 R |
| 3,911,415 | 10/1975 | Whyte | 340/310 A |
| 3,919,640 | 11/1975 | Simciak | 325/30 |
| 3,942,170 | 3/1976 | Whyte | 340/310 A |
| 3,980,954 | 9/1976 | Whyte | 325/48 |
| 4,048,619 | 9/1977 | Forman, Jr. et al. | 325/36 |
| 4,130,874 | 12/1978 | Pai | 340/310 A |

FOREIGN PATENT DOCUMENTS 1400477  7/1975  United Kingdom .

*Primary Examiner*—John W. Caldwell, Sr.
*Assistant Examiner*—Donnie L. Crosland
*Attorney, Agent, or Firm*—R. W. Smith

[57] ABSTRACT

An automated electric power distribution network includes a radio communication system for transmitting multipurpose, multitone signals in one or more signaling channels over the auxiliary channel or channels of one or more commercial broadcast stations. Energy management terminals receive the signals at remote locations served by the distribution network. Radio receivers at the terminals have frequency selective detectors responsive to different multitone signals. The selective allocation of the multitone signals at different remote locations provides different communication links for effecting common or different electric energy usage related responses at grouped or separate locations. Complex address and/or function encoded signal information is reduced by providing the frequency selective reception of the several multitone signaling channels available in a radio or television station auxiliary channel.

10 Claims, 9 Drawing Figures

MULTICHANNEL RADIO COMMUNICATION SYSTEM FOR AUTOMATED POWER LINE DISTRIBUTION NETWORKS

BACKGROUND OF THE INVENTION

This invention relates to a multichannel radio communication system for selectively signaling energy management terminals at electric power user locations. More particularly, the invention relates to a radio communication system for electric utility automated distribution networks wherein plural multipurpose, multitone signals are transmitted in different signaling channels of one or more auxiliary channels of a composite commercial broadcast channel concurrently transmitting broadcast station programming in a main channel.

Various communication systems have been proposed for remotely monitoring and controlling the use of electric energy supplied to large numbers of customer locations. Large numbers of geographically dispersed residential electric power customers are supplied electric energy by distribution networks. It is often desired to control and monitor, from a central control station, the levels of electric energy supplied by the distribution network.

One system for a remotely controlled or automated distribution system (ADS) is disclosed in U.S. Pat. No. 3,911,415, assigned to the assignee of this invention, wherein bidirectional carrier communication signals are transmitted over power line conductors between a central station and each of large numbers of electric power customers. U.S. Pat. No. 3,659,280 discloses a power line carrier communication system wherein plural transmitters and receivers are operated at different selective frequencies of signals transmitted over the power lines. The present invention is more closely related to and is an improvement of U.S. Pat. No. 3,980,954, assigned to the assignee of this invention, disclosing and claiming a bidirectional communication system for ADS control, utilizing a VHF-FM broadcast transmitter signal which is modulated with interrogation or command signals transmitted to radio receivers at each customer location. Response signals from the customer locations are transmitted by carrier signals applied through the power lines, as disclosed in the aforementioned U.S. Pat. No. 3,911,415.

In U.S. Pat. No. 3,815,119 a remote meter reading system is described utilizing electric power lines and a mobile radio interrogating arrangement. A plurality of meters have separate transmitters for transmitting meter data at different frequencies to receivers mounted on utility poles and connected to the power lines to receive the transmitter signals. The receiver signals are coupled to a transponder which includes a radio transmitter. Transmitted radio signals are produced including serial transmissions of the meter readings of each separate meter.

In U.S. Pat. No. 3,705,385 and British Patent Specification No. 1,400,477, published July 16, 1975, there are described remote meter reading systems utilizing RF communication links for readout of meter reading data. In U.S. Pat. No. 3,919,640, a remote meter reading system includes an RF radio communication link. Digital and analog data signals are transmitted on different frequency channels through the radio link. The receiving station includes plural bandpass filters and frequency detecting circuits to separately detect the data transmitted at different frequencies from the remote meter reading location. In U.S. Pat. No. 3,656,112, a remote utility meter reading system includes a communication system which produces carrier signals over the power line and also a radio link. A general addressing technique is utilized in each of the aforementioned systems wherein each remote location includes a unique binary coded address and the communication signals are transmitted in a serial fashion with each remote location being signaled or responding in a sequential manner with the associated location being designated by a unique code. Accordingly, complex and complicated address responsive circuitry is required in each of the communication terminals for handling separate communications to separate customer locations.

A very practical limitation exists for general radio control and monitoring systems in that governmental approval for allocation of frequencies is difficult to obtain. The existing radio frequencies are already allocated and widely used so that new uses for the frequencies will conflict and interfere with the existing frequency users.

The U.S. Pat. Nos. 3,534,266; 3,714,375 and 4,048,619 disclose radio communication systems, in addition to the aforementioned U.S. Pat. No. 3,980,954, wherein data signals are transmitted from a broadcast station transmitter in addition to the normal broadcast program information. The transmitted data is not disclosed for communicating selective address and control information to large numbers of remote locations receiving a quantity to be controlled and monitored by such information signals.

SUMMARY OF THE INVENTION

In accordance with the present invention, a radio communication system has one or more multipurpose, tone signals which frequency modulate at least one auxiliary subcarrier of a radio broadcast transmission signal. VHF-FM commercial broadcast stations provide readily available transmitter sources to link remote terminals at electric power customer locations with a central station utilizing tone signals arranged in accordance with this invention. The broadcast station receives base-band binary data signals from the central control station of an electric power distribution system. The data signals are intended for signaling one or more command or control functions to energy management terminals at individual and/or different groups of the customer remote locations to be controlled and monitored. A master VHF-FM radio or television broadcast station includes a plurality of data base-band modulators. Each modulator develops dual or two tone signals which shift between two frequencies about a different center frequency in response to the two logic states of the binary base-band data signals. The data base-band modulators define or originate the sending end of plural frequency separated signaling channels. The two tone outputs of the modulators frequency modulate a frequently unused subcarrier of a broadcast station auxiliary channel. A Subsidiary Communications Authorization (SCA) channel is included in the government licensed and approved composite FM broadcast channel bandwidth. Main broadcast information and the auxiliary subcarrier both frequency modulate the broadcast station VHF-FM transmitter main carrier signal. Such VHF-FM broadcast transmissions are typically receivable at the remote locations of electric power customers within a fifty to sixty mile radius of the broadcast transmitter.

An energy management terminal at each remote location of an electric power customer includes a receiver adapted to detect preselected tone signals of different signaling channels at the receiving end of each signaling channel. The remote locations are typically identified in group and individual address categories. In one preferred embodiment, universal block address, selected block address and unique address define the different address categories for the selectively designated transmissions. Separate data base-band signals and associated signaling channels are assigned to different address categories so that predetermined functions at the remote locations are automatically produced in different individual or commonly grouped responses. The receiver of each customer remote terminal frequency selects different signaling channels having two tone signals separately designating command functions but without either encoded address or command information. This avoids complicated address and function decoding circuitry at the customer terminal so that simple and inexpensive equipment can be used at some terminals. Different signaling channels are assignable to be received by separate groups of remote locations designated as selected block addresses. Thus, the radio receiver of a remote management terminal may have different frequency selective tone detectors from those of the receivers of other management terminals while certain common frequency tone detectors will be provided at the receivers of terminals of a group having a common selected block address.

Some signaling channels are primarily designated to have a common command function at universal or selected block addresses while others of the channels are primarily designated to carry different categories of command functions. Thus, certain demodulated binary data signal outputs of the signaling channel tone detectors directly activate terminal command response circuits. The demodulated data outputs of other tone detectors may include function codes which are applied to a function decoder circuit which in turn activates different terminal command response or function controlling circuits. Thus, the system also accommodates more complex terminal equipment having function and address signal decoding circuits. In one preferred mode, the two tone signals of each signaling channel are transmitted in thirty-two bit groups either as continuously repeating tones or with encoded information in predetermined binary encoded formats.

In one multipurpose aspect of a multitone signal of this invention, one remote terminal may include a simple receiver responsive to only the presence of one or more tones to directly effect a command function while another remote terminal may have a receiver and decoder circuit responsive to function encoded data in the same multitone signal to effect one of several commands at the other terminal. Therefore, different information in the form of different desired commands can be transmitted to different remote terminals or the same information or command can be transmitted to different remote terminals by a single multitone signal.

The system optionally includes data transmissions from the master broadcast station to a satellite commercial broadcast station having a primary service area beyond that of the master broadcast station and including an area served by a command electric power distribution network to be controlled.

In one preferred embodiment of the present invention, the transmitted binary data base-band signals modulate, in a frequency shift key fashion (FSK), the two-tone modulators with phased synchronization of the tone frequency transitions. The transitions between the two frequency tones of each signaling channel occur at the same and zero phase of each tone so as to avoid discontinuities caused by transitions at other than the zero phases thereof. Noise or interference perturbations produced by the otherwise transient effects of non-synchronous modulations are avoided. Phased synchronized frequency transitions are provided in the frequency modulations of the transmitter carrier signal as well as the auxiliary channel subcarrier and provide enhanced transmission of a multitone signal. The phased synchronized frequency transitions are accomplished by harmonically relating the data rate of the binary signals, the tone frequencies and the modulated subcarrier frequency and further harmonically relating the aforementioned signals with the frequency of the transmitter signal frequency in one of the preferred embodiments.

Accordingly, the present invention uniquely provides a multi-channel radio communication system utilizing commercial broadcast station transmissions capable of quickly and efficiently communicating multiple commands to alternatively individual customer locations or variously grouped customer location connected to an automated electric power distribution network. The above-noted advantages and further advantages and features of the present invention will be apparent from the detailed description of the drawings, briefly described hereinafter.

DETAILED DESCRIPTION OF THE PREFERRED EMBODIMENT

Figure 1:
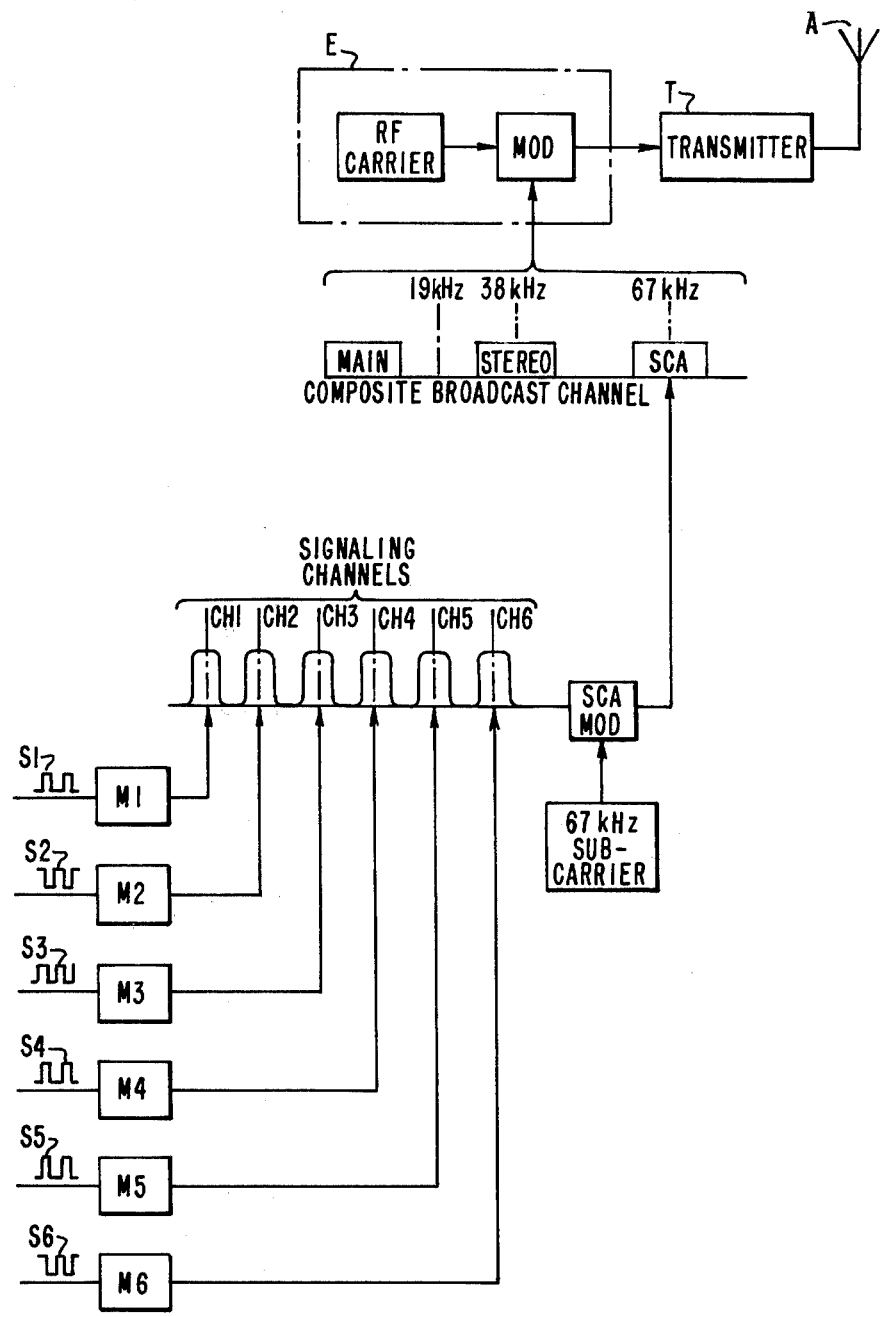
FIG. 1 is a diagrammatic representation of the transmitter portion of a multichannel radio communication system for automated electric power distribution networks utilizing a VHF-FM radio broadcast station auxiliary channel.

Referring now to the drawings, and more particularly, to FIG. 1, there is shown a diagrammatic illustration including basic components and related frequency channels of a commercial broadcast station arrangement transmitting tone signals in the system 10 shown in FIG. 2A, to briefly describe the present invention described in further detail hereinbelow. The antenna A radiates the main carrier of a broadcast station being a VHF-FM station in one preferred embodiment. The main carrier signals are provided from the exciter E and transmitter T. The information of the composite broadcast channel modulates the main carrier at the exciter E. As described further hereinbelow, the composite broadcast base-band channel includes main and stereo channels for transmitting normal FM-FM stereo broadcast programming and a Subsidiary Communication Authorization (SCA) or auxiliary channel for transmitting the multipurpose tone signals of the present invention. The subcarrier of the SCA channel is first taken to have a nominal frequency of 67 kHz. An exemplary number of six signaling channels CH1, CH2, CH3, CH4, CH5 and CH6 are shown in FIG. 1 each having a separate frequency bandwidth. These channels include information carrying multipurpose tone signals produced by the data base-band tone modulators M1, M2, M3, M4, M5 and M6. The signaling channels CH1-CH6 include the frequency bandwidths of the multipurpose tones and effectively extend from the channels originating in the transmitter, through the modulations of the auxiliary and main carriers to the receiver frequency detection channels for the corresponding multipurpose tone signals. The output tone signals FM modulate the 67 kHz subcarrier at an SCA or auxiliary channel modulator. Data base-band data signals S1, S2, S3, S4, S5 and S6 are applied to the tone modulators M1, M2, M3, M4, M5 and M6, respectively. The base-band data signals may have one of three general characteristics. First, regularly reoccurring two level bit streams in the signals correspond to binary one and zero logic states so that two frequency tones are correspondingly provided at the associated modulator output. Second, a DC voltage level may produce a single tone and, if the DC voltage is applied through a switch, the tone can be removed or a second tone can be produced when the switch is opened or the DC voltage is removed from the associated modulator. Third, the base-band data signals include binary coded data to produce correspondingly coded tone frequencies.

Accordingly, the tone signal outputs of the tone modulator M1 through M6 can provide the presence of any tone within the frequency band of the associated signaling channel. Such a tone can be used to command a hot water or other electric heater device at one location on, and the absence can command the device to turn off, or vice versa. At another location, the presence or absence of the same tone can similarly command another device such as an air conditioner on and off. The modulators can produce two or more tones within the signaling channel frequency band to provide increased information content of multitone signals. The presence of a multipurpose two-tone signal in a signaling channel can be used to control a single device or the separate tones can be used to control two devices. The same two-tone signal can be binary coded to define plural commands to control different devices and equipment. Thus, the same multipurpose tone signal is receivable by different remote locations to control a designated device at one location or one of plural devices at another location.

Figure 2A:
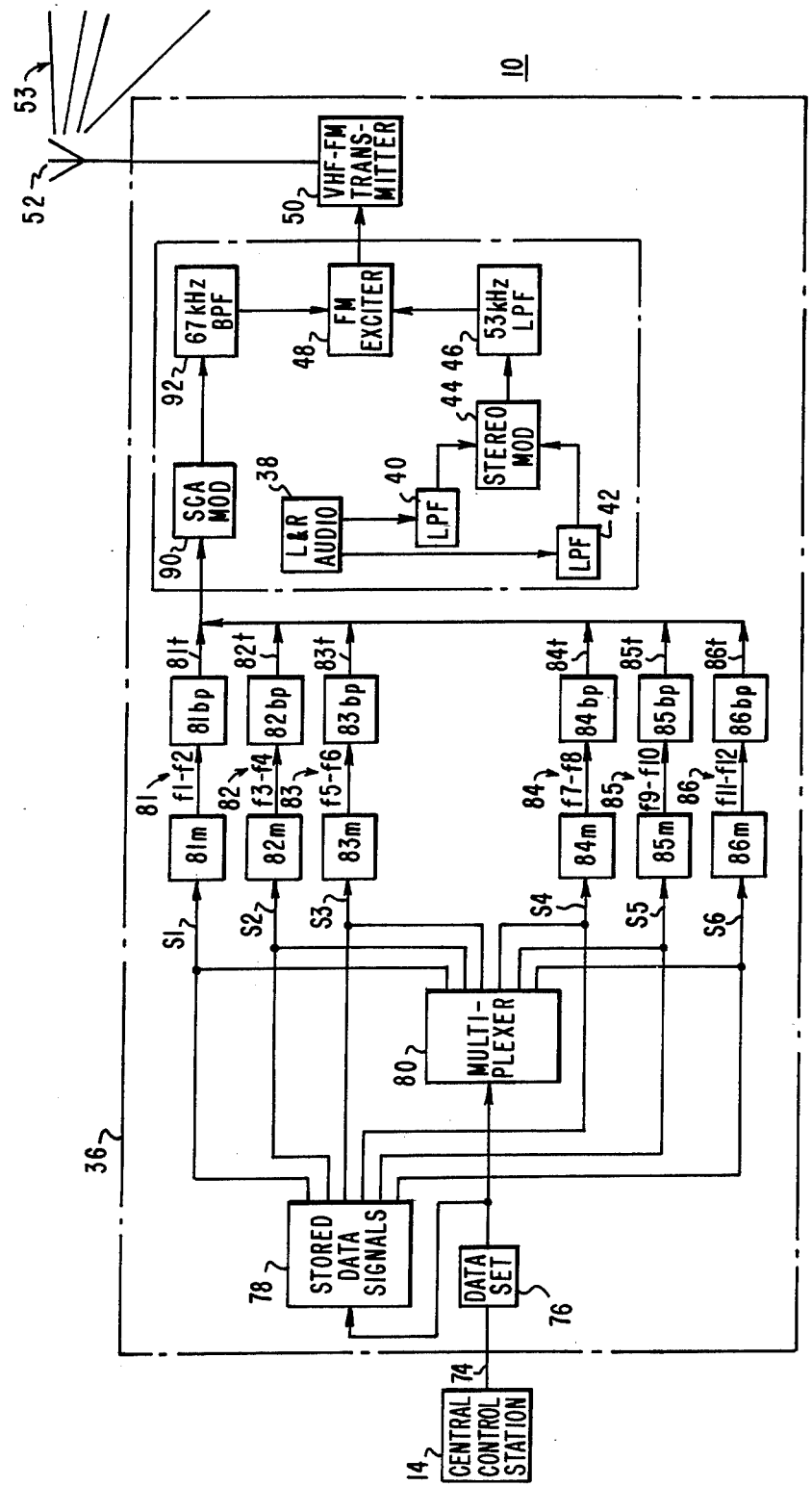
FIGS. 2A and 2B are a block diagram of a multichannel radio communication system for automated electric power distribution networks made in accordance with the present invention.
Figure 2B:
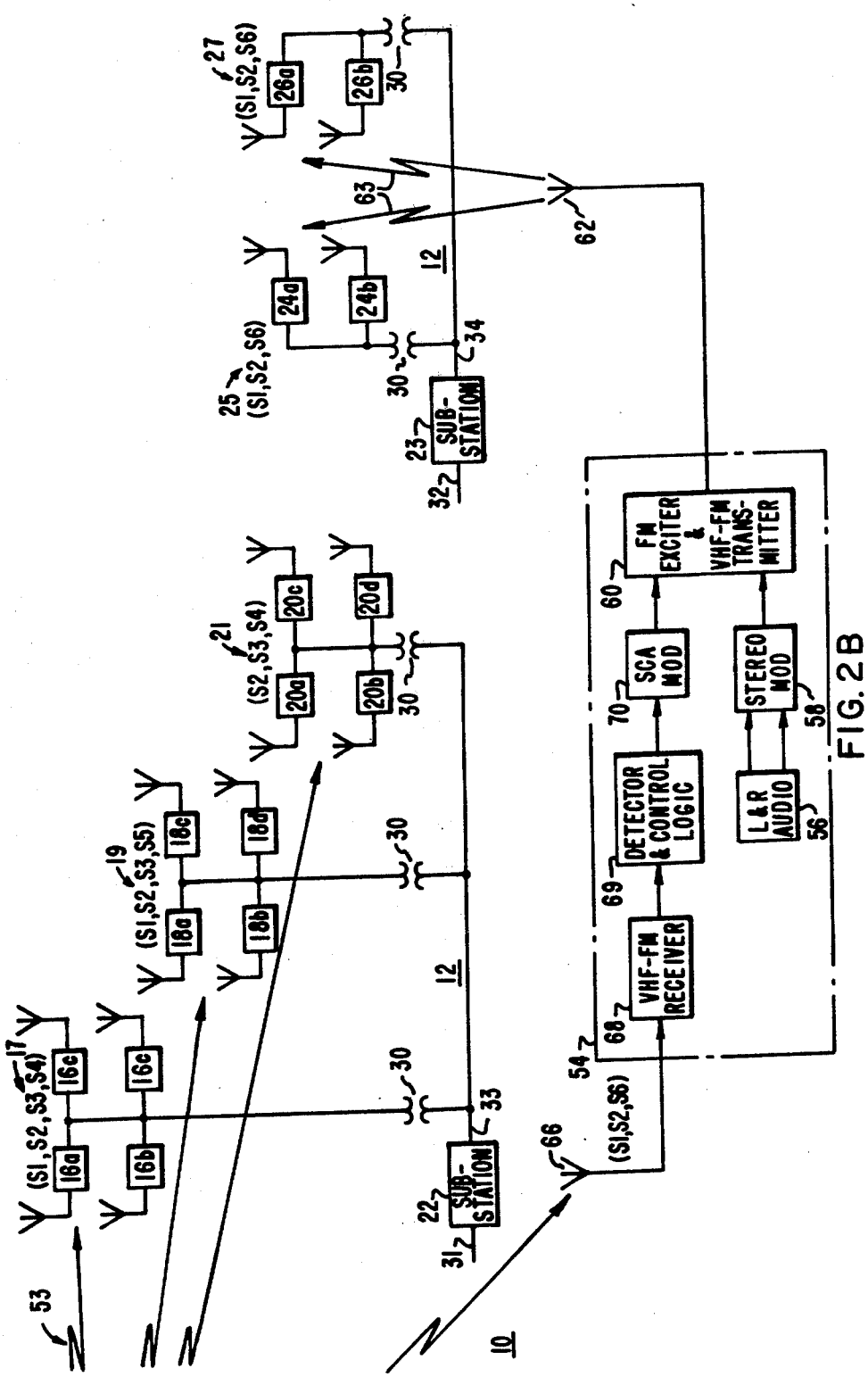

Referring now in more detail to the present invention, FIGS. 2A and 2B illustrates a block diagram of a multi-channel radio communication system 10 for an automated electric power distribution network 12, also referred to as an automated distribution system (ADS) for remotely controlling and monitoring energy usage via tone signals transmitted to remote locations of customers supplied by the distribution network. The communication system 10 provides communication links between a central control station 14 and each of the electric power user or customer remote locations connected to the power line distribution network 12. Exemplary customer remote locations designated 16a, 16b, 16c, and 16d are included within one predetermined group 17 of remote locations of the network 12. Similarly, the customer remote locations 18a, 18b, 18c and 18d define another group 19; and the customer remote locations 20a, 20b, 20c and 20d define still another group 21. The groups of remote locations 17, 19 and 21 are representative of groups in separate subgeographical areas containing hundreds of a few thousand customer remote locations being supplied electric energy from the power line conductors supplied from one or more substations including representative substation 22 included in the distribution network 12.

Another substation 23 in the network 12 supplies still further groups of electric power customer remote locations. Locations 24a and 24b define a group 25; and customer remote locations 26a and 26b define a group 27, generally geographically adjacent the group 25. The remote customer locations included in the group categories 25 and 27 are understood to be geographically separate from the remote locations defined by the group categories 17, 19 and 21, but served by the same distribution network 12. The latter groups 25 and 27 of remote locations are served by the substation 23 which, like the substation 22, supplies the primaries of a plurality of distribution transformers 30. The substations 22 and 23 are supplied by high voltage feeder conductors 31 and 32, respectively, which are a part of the electric power system controlled from the central control station 14. The control station 14 is supervised by an electric utility company supplying all of the remote locations of the electric power customers of the network 12 shown in FIG. 1. The subdistribution primary conductors 33 and 34 supply the distribution transformers 30 from the substations 22 and 23. The secondaries of the transformers 30 supply the remote locations with electric energy at generally usable voltages such as 120 and 240 volts at sixty Hz, in a well known manner.

Each of the customer remote locations shown in FIG. 1 includes load or energy management remote terminals designated 35 or 35a in FIGS. 3, 4A and 4B substantially as described briefly hereinbelow and in more particular detail in U.S. Pat. No. 4,130,874 issued Dec. 19, 1978, and assigned to the assignee of this invention and incorporated herein by reference or portions thereof in simpler forms permitted by the system of this invention. Each remote management terminal includes load controlling and monitoring operative functions and a communication signal receiving function, generally described in the aforementioned patent application and also as described hereinbelow in connection with the descriptions of FIGS. 3, 4A and 4B. It is to be generally understood that each customer or electric power user remote location includes electric loads to be controlled by the multichannel radio communication system 10. Also each remote location includes electric energy measuring meters which may include electronic encoding means for encoding the measured consumption of electric energy and/or meters which are adapted for multi-rate metering in which electric energy consumption is metered at different rates for different times or day and includes a time control for effecting such different time of day metering which is remotely actuated. One such metering device is disclosed in U.S. Pat. No. 4,128,807 issued Dec. 5, 1978, and assigned to the assignee of this invention, wherein a multi-dial register is controlled by a solenoid device which is effective to operatively connect different sets of indicator dials with the metering movement of an induction watthour meter. The radio communication system 10, as described in detail hereinbelow, is described as a unidirectional system; however, it is contemplated that the features of the present invention may be incorporated in a two-way communication system, either having radio communications in both directions or communication in a return system, including a power line carrier system, such as described in the aforementioned patent, U.S. Pat. No. 3,980,954 and also as described in the U.S. Pat. No. 3,911,415, also described hereinabove.

An important feature of the present invention utilizes the aforementioned auxiliary channel or channels of a master VHF-FM commercial broadcast station 36 shown in FIGS. 1 and 2A in a manner which is an improvement upon the manner in which such a station is utilized, as described in the aforementioned Pat. No. 3,980,954. It is contemplated that TV broadcast stations may also include an auxiliary channel for use described herein and the reference to radio transmissions herein and in the claims is intended to include electromagnetic radiations known to be effectively emitted and detected by an antenna. The station 36 is operated in accordance with governmental regulations for commercial FM and FM stereo broadcast stations, and is well understood by those skilled in the art. The general principles of FM broadcasting are described in the book "Principles of Communication Systems" by H. Taub and D.L. Schilling, published by McGraw-Hill, Inc., 1971. The Federal Communication Commission (FCC) Rules and Regulations Sections 73. 294 et seq. define the SCA requirements that accompany an FM broadcast station license. The publication "SCA For FM Broadcast Stations" by Leonard E. Hedlund, available from McMartin Industries, Inc., Omaha, Neb. 68127, describes the subsidiary communications authorization (SCA) channel which is an auxiliary channel that is transmitted along with a main broadcast channel of the composite FM-FM stereo broadcast channel. The composite broadcast channel as referred to herein is the complete base-band signal of an FM broadcast station, shown in FIG. 1, or that of an equivalent broadcast station used to frequency modulate the transmitter of a FM broadcast station.

Each composite broadcast channel, as shown in FIG. 1, is included in a broadcast transmitter signal having a government authorized transmitting or main carrier frequency between 88 and 108 MHz. As is presently authorized under appropriate governmental regulations, the composite FM broadcast channel spectrum of main, stereo and SCA channels includes a main channel modulation between 0 and 15 kHz, a pilot carrier at 19 kHz, a stereo channel (L-R) between 23 kHz and 53 kHz having a 38 kHz AM modulated, suppressed carrier and an SCA FM modulation channel, also referred to herein as an auxiliary channel, between 61 kHz and 73 kHz, and having a subcarrier of 67 kHz. The composite broadcast channel including the FM main and stereo and SCA channel has approximately a ±75 kHZ limit. The frequency response of the SCA channel is 30 to 5000 kHZ ±1.5 dB. The multipurpose tone signals described in further detail hereinbelow are used to frequency modulate the nominal 67 kHz subcarrier shown in the SCA channel shown in FIG. 1. One preferred form of multipurpose multitone signals includes two-tone or dual tone frequency shift key (FSK) tone frequencies within one or more signaling channels of the 30 to 5000 Hz substantially linear frequency response of the auxiliary SCA channel. The FCC Rules and Regulations permit SCA multiplex operations having several SCA subcarriers which can have instantaneous frequencies within 20 to 75 kHz if the station is not engaged in stereo broadcasting. Thus, tone signals of different signaling channels may modulate different SCA subcarriers. Also, as noted in the McMartin Industries publication the ±75 kHz limitation of the composite broadcast channel is being considered to be enlarged with some contemplating a 95 kHz SCA subcarrier.

The present invention advantageously uses the established and regulated SCA channel of FM broadcast stations which is largely under-utilized. The large number of such FM stations and their large presence in highly populated areas, where electric energy management is most needed, further enhances the use of the SCA channel as described herein. The FM transmissions further provide high quality transmission paths.

A typical broadcast transmitter portion of the broadcast station 36, diagrammatically shown in FIG. 1, is well known and described briefly in the aforementioned McMartin publication, and is shown in the block circuit of FIG. 2A. A left and right (L and R) audio signal source 38 is applied to the 15 kHz low pass filter circuits 40 and 42 which have outputs applied to the stereo modulator 44. The output of the modulator 44 includes the main program broadcast material or information and is applied to a 53 kHz low pass filter 46 which prevents any frequencies above the main broadcast material channel subcarrier generating and modulation processing circuits from entering the FM exciter 48. The FM exciter 48 generates the broadcast signal main carrier, which for example, may be 100 mHz, that is applied to a transmitter 50. The transmitter 50 includes a power amplifier to produce radiations from an antenna 52 which provide the broadcast transmission signals 53 in the form of electromagnetic radiations including the main carrier at the exemplary 100 mHz frequency. The FM exciter 48 is also frequency modulated by modulated signals of the auxiliary or SCA channel, as described further hereinbelow.

It is to be noted that the primary service area, or geographic extent, of the electromagnetic radiation signals 53 transmitted from the antenna 52 are receivable by typically commercially available FM-FM stereo radio receivers within distances in the order of fifty to sixty miles, which of course may vary due to the topographical area and the output power of the transmitter 50. Such receivers are easily equipped to receive the auxiliary SCA channel.

A satellite VHF-FM commercial broadcast station 54 is arranged with a composite broadcast channel having main and stereo channels including FM and FM stereo broadcast information plus an auxiliary or SCA channel as described for the station 36 but serving a different geographical area than does the station 36. Accordingly, the station 54 may have its own audio broadcast information source 56 which is connected to FM stereo or FM monaural modulating and processing circuits 58 for connection to an FM exciter and transmitter 60 which broadcasts, at a different frequency than does the station 36, from an antenna 62 within the regulated 88 to 108 mHz frequency band of such VHF-FM broadcast stations. The broadcast transmission signals 63 formed by electromagnetic radiation from the antenna 62 may have a 92 mHz main carrier frequency to carry the full broadcast channel bandwidth of the station 54.

The station 54 includes a receiving antenna 66 and receiver 68 intended to receive transmissions from the antenna 52 to relay information or initiate information upon command from the central control 14 to the customer remote location groups 25 and 27, referred to hereinabove, being part of the common power line distribution network 12 but beyond the range of the transmissions from the antenna 52. The receiver 68 is arranged to be a higher sensitivity type but otherwise substantially as described for the remote terminal receivers as shown in FIG. 3. Accordingly, the receiver 68 is responsive to predetermined multipurpose tone signals transmitted from the station 36. The station 54 includes detector and control logic circuit 69 suitable for modulating the SCA subchannel of the station 54 at the SCA modulator 70 to retransmit the data signals, described further hereinbelow, originating from the central control station 14. The transmissions from the antenna 62 of the station 54 are received by the energy management terminals located at each of the customer remote locations, exemplified by the group categories 25 and 27.

Referring now in particular detail to the multichannel radio communication system 10 of the present invention, binary base-band data signals are typically transmitted in a serial data transmission from the central control station 14 by means of a land line or telephone line 74, connected to the input of a standard data set 76. The output of the data set is applied to two alternate circuit devices 78 and 80. Device 78 is a source of pre-programmed and stored data signals S1, S2, S3, S4, S5 and S6, which may take the form of a magnetic tape recorder or pre-programmed logic circuit which produces binary base-band data signals which are corresponding to desired command information to be received and responded to at preselected ones of the electric power customer remote locations. The source 78, in one form, can produce the plural data signals S1-S6 simultaneously in response to a remote command signal received through the data set 76 from the central station 14. Further connected to the output of the data set 76 is a multiplexer 80 or solid state sequential switching circuit which is effective to separately output the binary base-band data signals transmitted serially from the data set 76 to a plurality of outputs as described hereinafter.

A plurality of multipurpose signaling channels CH1, CH2, CH3, CH4, CH5 and CH6, shown in FIG. 1 having originating circuit channels 81, 82, 83, 84, 85 and 86 in the transmitter end of the signaling channels of the communication system 10, which may include substantially more than the six channels shown, as will be apparent to those skilled in the art. The channels 81 through 86, corresponding to channels CH1-CH6 in FIG. 1, define sub-subchannels of the transmitter station 36 and include data base-band two-tone modulators 81*m*, 82*m*, 83*m*, 84*m*, 85*m* and 86*m*, respectively. The channels also include a bandpass filter 81*bp*, 82*bp*, 83*bp*, 84*bp*, 85*bp*, and 86*bp*, respectively. The binary base-band data signals S1, S2, S3, S4, S5 and S6 are applied to the modulators 81*m* through 86*m* from either the data set 76 and multiplexer 80 or the source 78. The one and zero binary states of the binary base-band data signals S1 through S6 FSK modulate two tones in the audio frequency range at the modulators 81*m* through 86*m*, respectively.

Figure 5:
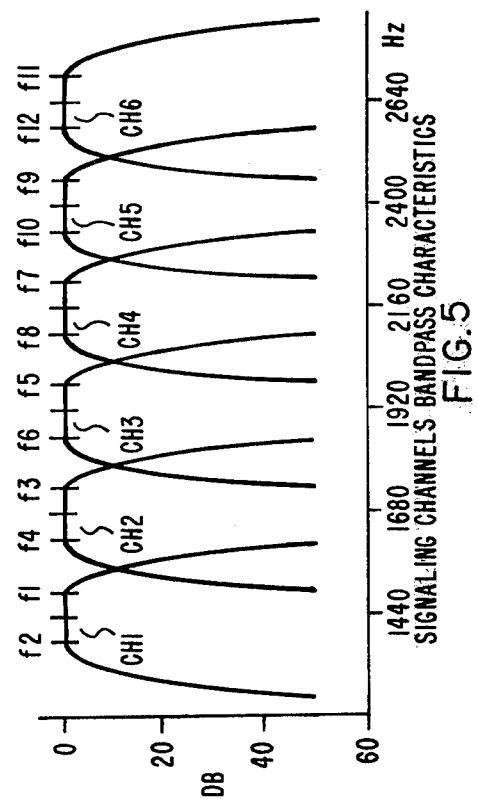
FIG. 5 is a graph of the attenuation-frequency characteristics of bandpass filters utilized in the transmitter and receiver units of the system shown in FIGS. 1, 2A, 2B, and 3.

The outputs of the modulators produce tone frequencies f1-f2, f3-f4, f5-f6, f7-f8, f9-f10, and f11-f12, in the multipurpose tone signals 81*t*, 82*t*, 83*t*, 84*t*, 85*t* and 86*t*, respectively, as described further hereinbelow. These outputs are applied through the bandpass filters 81*bp* through 86*bp*. The frequency characteristics of the bandpass filters are shown in FIG. 5. The tone frequencies are applied to an auxiliary or SCA modulator 90 having a suitable subcarrier frequency such as 67 kHz, as described in the aforementioned McMartin publication or a different frequency as described below. The total frequency spectrum of the signaling channels 81 through 86, each having its own discrete frequency band, is within the 30 to 5000 Hz frequency spectrum of the auxiliary of SCA channel of the station broadcast channel. A second level of modulation occurs at the auxiliary SCA modulator 90, wherein the frequencies of the tone signals 81*t* through 86*t* of the signaling channels 81 through 86 modulate the SCA subcarrier of 67 kHz, which is passed through a bandpass filter 92 to the FM exciter 48 described hereinabove. A third level of modulation occurs at the exciter 48 whereby the auxiliary SCA channel, modulated by the tones of channels 81 through 86 and the main FM and FM stereo channels, modulated by the audio information, are applied to the broadcast transmitter signal for emitting the electromagnetic radiations 53 from the antenna 52.

In one mode of operation of the system 10, so-called standard frequency assignments are utilized in defining the system signaling channels CH1, CH2, CH3, CH4, CH5 and CH6 originating at the channels 81 through 86 in the transmitter. One preferred data rate is 128 bauds or bits per second and another is 256 bauds or bits per second. Other corresponding data rates may be used, however, as the number of available channels decreases as the the data bit rate increases. In the system 10 described herein, one embodiment includes the 128 bit per second rate in which a channel spacing of 240 Hz is utilized with a frequency shift of ±60 Hz. The center frequencies of the 128 bits per second data rate includes center frequencies of each channel substantially equal to 240, 480, 720, 960, 1200, 1440, 1680, 1920, 2160, 2400, 2640, 2880, 3120, 3360, 3600, 3840, 4080, 4320 and 4560 Hz, which gives nineteen channels for data communications. Six channels are described hereinabove and are shown in FIG. 5, it being understood that with the system described, as many as twenty channels can be effectively used; however, fewer or more channels are contemplated for different embodiments. Also, plural auxiliary subcarriers may be modulated by different numbers of signaling channel multitone signals.

Figure 6:
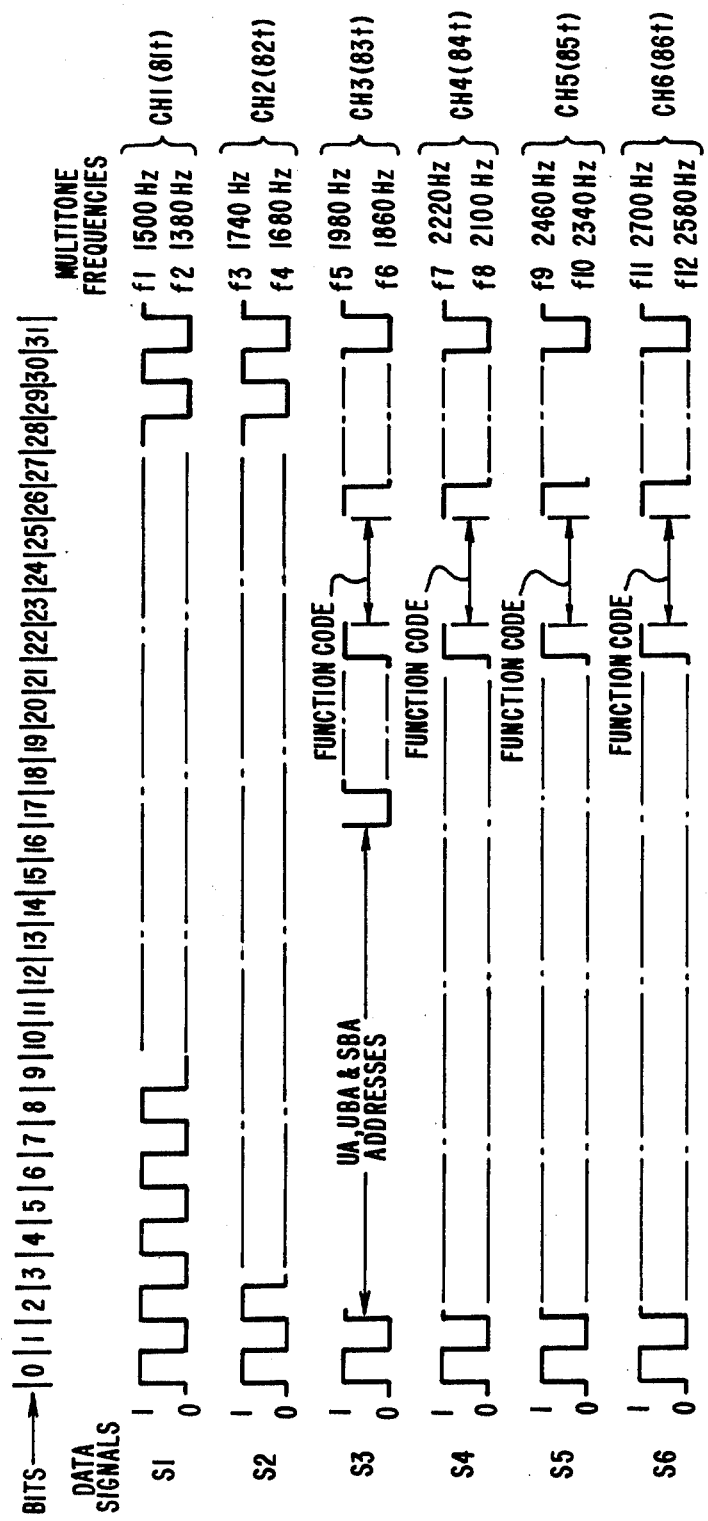
FIG. 6 is a graph of exemplary binary base-band data signals associated with each different signaling channel transmitted from the commercial broadcast station shown in FIGS. 1 and 2A.

In a system having 256 bits per second data rate, the channel spacing would be 480 Hz, with a frequency shift of ±120 Hz. With the one exemplary system described herein having the 128 bit rate noted hereinabove, reference is made to FIG. 6, showing a graph of the binary base-band data signals S1 through S6 modulating the signaling channel frequencies. The auxiliary SCA channel bandwidth includes the center frequencies of 1440, 1680, 1920, 2160, 2400 and 2640 Hz of the six signaling channels CH1 through CH6 indicated in the graphs of the bandpass filter characteristics shown in FIG. 5. The channels extend ±60 Hz of the center frequency, and in FIG. 6, there is shown the six channels carrying data signals S1 through S6 wherein the binary one or mark (M) and binary zero or space (S) logic levels are indicated. At the right-hand end of each of the signals S1 through S6 are the two-tone frequencies developed in the corresponding signaling channels. The binary data signals S1 through S6 are applied to the modulators 81$m$ through 86$m$, respectively, to produce the frequencies f1-f2, f3-f4, f5-f6, f7-f8, f9-f10 and f11-f12, in the signaling channels CH1 through CH6, respectively, shown at the right-hand side of the signals S1 through S6 in FIG. 6. The identical frequency vs. attenuation responses of the bandpass filters 81$bp$ through 86$bp$ are shown in FIG. 5, as they are provided for the signaling channels having the aforementioned center frequencies and associated multitone signal frequencies f1 through f12.

The bit cells or intervals shown at the top of FIG. 6 correspond to the bits described in the aforementioned U.S. Pat. No. 4,130,874 and incorporated herein by reference. The manner that addressed electric energy related commands are conveyed by the information of the data signals S1 through S6 will become more apparent with the description of the energy management remote terminal and associated receiver at each of the customer locations, as described hereinbelow. Adjacent the group designating numerals 17, 19, 21, 25 and 27 are the particular data signal S1-S6 to be transmitted to the locations of the associated group by the associated multitone signals.

Briefly, the data signal S1 is a repetitive series of marks and spaces or binary ones and zeros as shown, which continuosly shift between the 1500 and 1380 Hz frequencies in the channel 81. Similarly, the data signal S2 is a repetitive series or continuous bit stream of ones and zeros or marks and spaces which are represented by 1740 and 1680 Hz frequencies in the channel 82. The data signal S3 includes a similarly coded format as described for the thirty-two bit coded signals in the aforementioned Pat. No. 4,130,874 in which the thirty-two bit intervals are utilized with bit intervals two through sixteen utilized for a unique address, universal block address and selected block addresses, as described in the aforementioned application. Also included in the data format are three data bit intervals 23 through 25 which are utilized for function codes to effect desired command, control or interrogation responses at the customer locations. The binary one and zero or mark and space of data signal S3 are provided by the 1980 and 1860 Hz frequencies in the channel 83. The data signals S4, S5 and S6 are shown substantially identical; however, they may include different coded functions in the bit intervals 23 through 26, and each has different FSK tones 2220 to 2100, 2460 and 2340 Hz and 2700 and 2580 Hz, respectively in channels 84, 85, and 86.

As described further hereinbelow, the signals S4 and S5 are intended to be sent to separate selected block address group categories of the customer locations, such as the group 17 and group 18, respectively. The signals S4 and S5 of signaling channels 84 and 85 are provided for separate selected block addresses by having different frequencies so as to not require the binary coded address in the signal format. The data signal S6 is intended to be received and decoded by the satellite broadcast transmitter 54 and contains a function code between the bit intervals 23 through 25 for effecting a pre-programmed output therefrom or other desired function or to be immediately retransmitted as received. It is to be understood that additional signaling channels including others of the data signals S1 through S5 may also be received by the satellite broadcast station 54 for immediate retransmission at its transmitter frequency to the customer remote locations within its primary service area.

Figure 7:
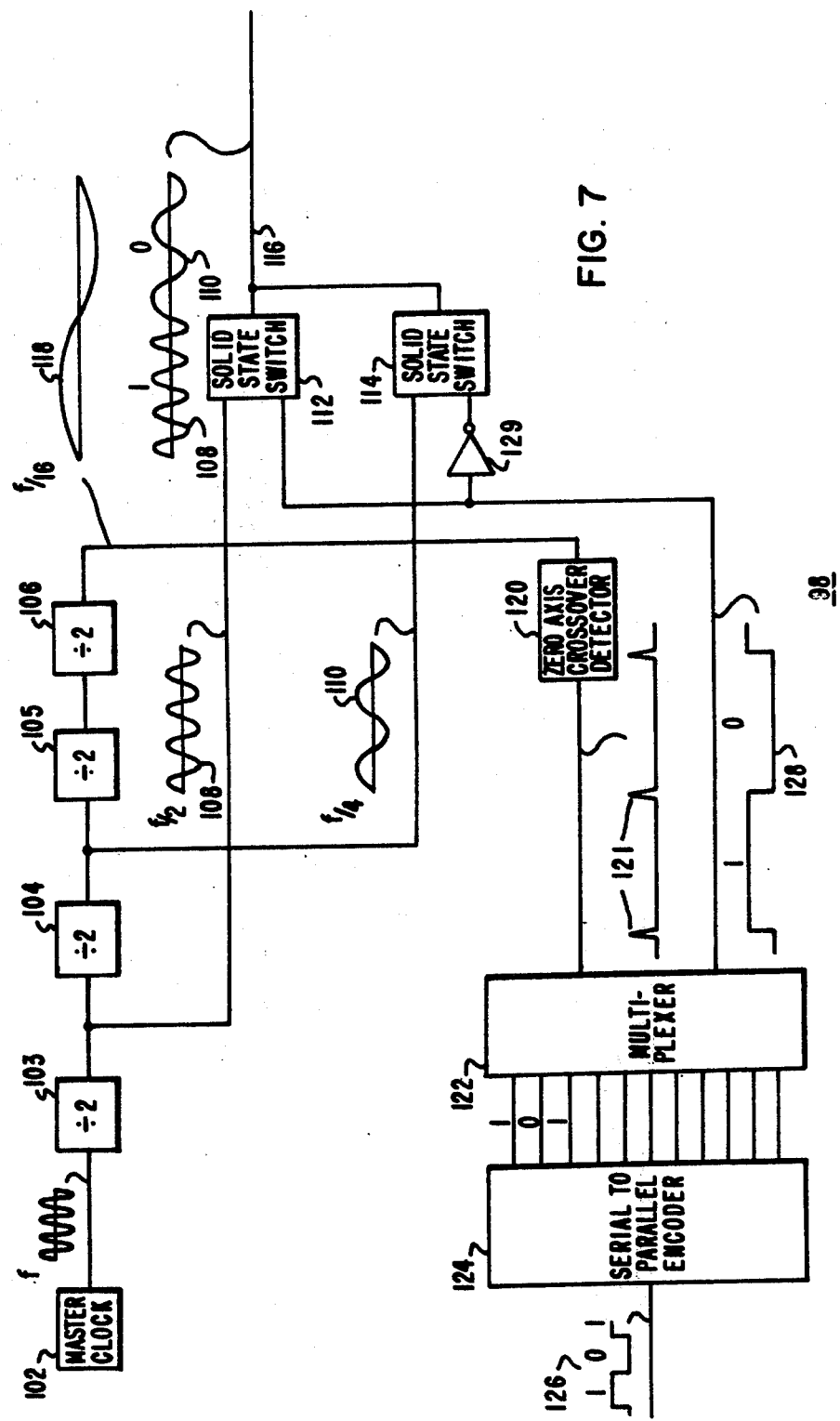
FIG. 7 is a two-tone modulator having a phased synchronized mode of frequency transitions for use in the transmitters shown in FIGS. 1 and 2.

In one embodiment of the data signal transmission of the communication system 10, a phased synchronized frequency transition type of dual tone modulation that may be performed in one exemplary embodiment of a phased synchronizing tone modulator 98 shown in FIG. 7. The type of modulator 98 is includable within the modulators 81$m$ through 86$m$, described hereinabove in connection with the description of FIG. 2A. The modulator 98 effects a synchronized transition from one tone frequency to the other so that the transition occurs as the phase angle of each tone is at a zero. This avoids discontinuities in the tone frequency changes which produce transients and noise. Thus, when one of the tones ends at three hundred sixty degrees or zero phase, the next tone begins at zero phase. A block schematic diagram in FIG. 7 illustrates the modulator 98 in a simplified form for purposes of describing one type of the phased synchronized mode of frequency transition. A master clock source 102 provides a signal at a reference frequency f, which in turn is divided by divide-by-two divide circuits 103, 104, 105 and 106. By way of example, the dividers are divided by two in order to make a simplified understanding of the present invention. The output of the divider 103 is determined by a first frequency tone to be transmitted in the associated signaling channel, having a frequency of f/2 and designated 108. The output of the frequency divider 104 is determined to be the second and lower frequency tone f/4 to be transmitted in the signaling channel which is designated 110 and is one-half the other tone frequency, f/2. In practice, these frequencies may be other than one-half so long as they are harmonically related. The first tone 108 is applied to one solid state switch device 112; and the second tone signal 110 is applied to a second solid state switch device 114. The other of the two inputs shown to the solid state switches 112 and 114 is a switch enabling input described further hereinbelow so as to gate either the tones 108 or 110 to the commonly connected output 116. The output of a signaling channel modulator is provided by the output 116 so that the mark or binary one is formed by the tone 108 having frequency f/2 and the space or binary zero is formed by the tone 110 having the frequency f/4.

The output of the divide-by-two divider circuit 106 provides a signal 118 which is 1/16th or f/16 of the frequency f at the output of the clock source 102 so as to provide a signal having a one hundred eighty degree phase interval or one-half period equal to one data bit interval. The output of the divider circuit 106 supplies a zero axis crossover detector circuit 120, which is effective to produce pulses 121 each time the signal 118 passes through zero, one hundred eighty, and three hundred sixty degree phase angles. The pulse signals 121 are at intervals corresponding to the bit intervals, such as shown in FIG. 6, and are applied to the clock input of a multiplexer 122. Parallel data coded inputs of multiplexer 122 are received from a serial to parallel encoder 124, which is connectable to the output of the data set 76 shown in FIG. 2A. The binary base-band data signal 126 is representative of one of the data signals S1 through S6 applied to the serial to parallel encoder 124 so that a predetermined number of input serial coded data bits, corresponding to the twelve outputs of the encoder 124 are produced at the outputs in a parallel fashion. The number of bits illustrated in FIG. 7 is for purposes of explanation and may include as few as two or as many as thirty-two or more bits in accordance with the coding arrangement described in the aforementioned Pat. No. 4,130,874, and shown in FIG. 6.

The pulses 121 are applied to the multiplexer 122 to establish the beginning and end of each bit interval of binary data which is to be modulated and carried in one of the signaling channels described hereinabove. If the first or top data bit of the encoder 124 is a binary one the multiplexer will be gated to a one state, as shown at the left-hand portion of the signal 128. This occurs at the time that both the signal 118 and the signals 108 and 110 are each at the zero phase angle condition. This is because they are all energized by signals having the same phase angle. The logic of the solid state gates or switches 112 and 114 is such that a positive or one binary state enables them. Accordingly, the zero logic of the signal 128 is inverted by the inverter 129 to enable the gate or switch 114 and disable switch 112. This allows the lower frequency tone signal 110 to pass through to the output 116 at the instant the signal 112 passes through the zero crossover or zero phase condition.

In operation of the modulator 98, the initial sequence of a binary one data symbol followed by a binary zero data symbol in the data signal 126 is assumed. The initial pulse 121 occurs as the phase of the output of circuit 104 goes through zero while the first binary one of the signal 126 is present at the top input to the multiplexer 122. This produces the first bit at binary one in the signal 128. The switch 112 is gated on by the positive state of the signal 128 to gate the high frequency tone signal 108 to the output 116. When the next pulse 121 occurs, as determined by the one-half period of signal 118, the second output from the encoder 124 is applied as the next data bit output of multiplexer 122 in signal 128 which has binary zero logic. The transition phase of the frequency signal 108, as well as the signal 110, is at the zero phase angle, at which time the negative state of the signal 128 disables the switch 112 and the positive state of the output of inverter 129 enables the switch 114 so that now the lower frequency signal or tone 110 passes to the output 116 without an abrupt change in the signals at output 116. In an analogous manner, the different tone frequencies of the several channels of the system shown in FIGS. 1 and 2A may be produced so as to have the synchronized multitone transition modulation technique as diagrammatically shown and described in connection with FIG. 7.

The data rate of the data signals 126 is necessarily harmonically related to the tone frequencies 108 and 110 in the operation of the modulator 98 shown in FIG. 6. The harmonic relationship permits the above-mentioned modulation technique to decrease a source of extraneous noise and perturbations due to discontinuity in the frequency shift between tone signals as they are transmitted to and demodulated and decoded at the receiver. The harmonic relationship between the data rate DR in bits per second, and the two tone frequencies F1 and F2 in Hertz is expressed as follows: DR=F1/N=F2/M; where N and M are integer numbers. The harmonic relationship between the auxiliary subcarrier frequency Fc and the tone frequencies F1 and F2 is expressed as Fc=QF1=PF2, P and Q are integer numbers. Accordingly, a subcarrier of 67 kHz with P=67 and Q=134 provides F1=1000 Hz and F2=500 Hz. Data rates DR=250 or 125 bits per second where N=4 or 8 and M=2 or 4, respectively, provide harmonically related data rate values. It is also noted that the 67 kHz subcarrier is harmonically related to the exemplary 100 mHz main carrier frequency of the transmitter 50.

In another example in accordance with the present invention, if the data rate is 128 bits per second as described hereinabove, and it is desired that the tone frequencies are to be integrally related to the base-band data rate or a harmonic thereof, then a tone frequency for a logic zero may be selected as 1280 Hz and a logic one would correspondingly be 1408 Hz. These two tones are at frequencies that are integral multiples, N and M equal to ten and eleven, respectively, of the 128 bits per second data rate with frequency deviations of ±64 Hz. about signaling channel center frequency of 1344 Hz. In some instances it may be only possible to select only one of the two tones as a harmonic of the data rate and still achieve improved performance. In this instance, two tones of 1280 and 1460 Hz. are used, for example, having a deviation of ±90 Hz. about a center frequency of 1370 Hz. In the two tone frequencies noted in connection with the description of FIG. 6, the frequencies of the tones designated are not selected to be harmonically related to the frequency of the 128 bits per second data rate or subharmonically related to the auxiliary or SCA subcarrier, so they have a frequency which is produced by dividing the subcarrier 67 kHz by a whole number. Improved performance is found if one tone, such as 1675 Hz, is subharmonically related to the 67 kHz subcarrier and harmonically related to the data rate such as 67 bits per second. A second tone would be 1742 Hz harmonically related to the 67 bits per second data rate, but not subharmonically related to the 67 kHz subcarrier.

The use of multiplex operation of the SCA channel permits the use of several subcarriers. Therefore, more flexibility and numbers of signaling channels may be provided so that the data rates, the two tone frequencies and the subcarrier frequencies can all be harmonically related for use in the synchronized two tone frequency transition type of modulation.

Figure 3:
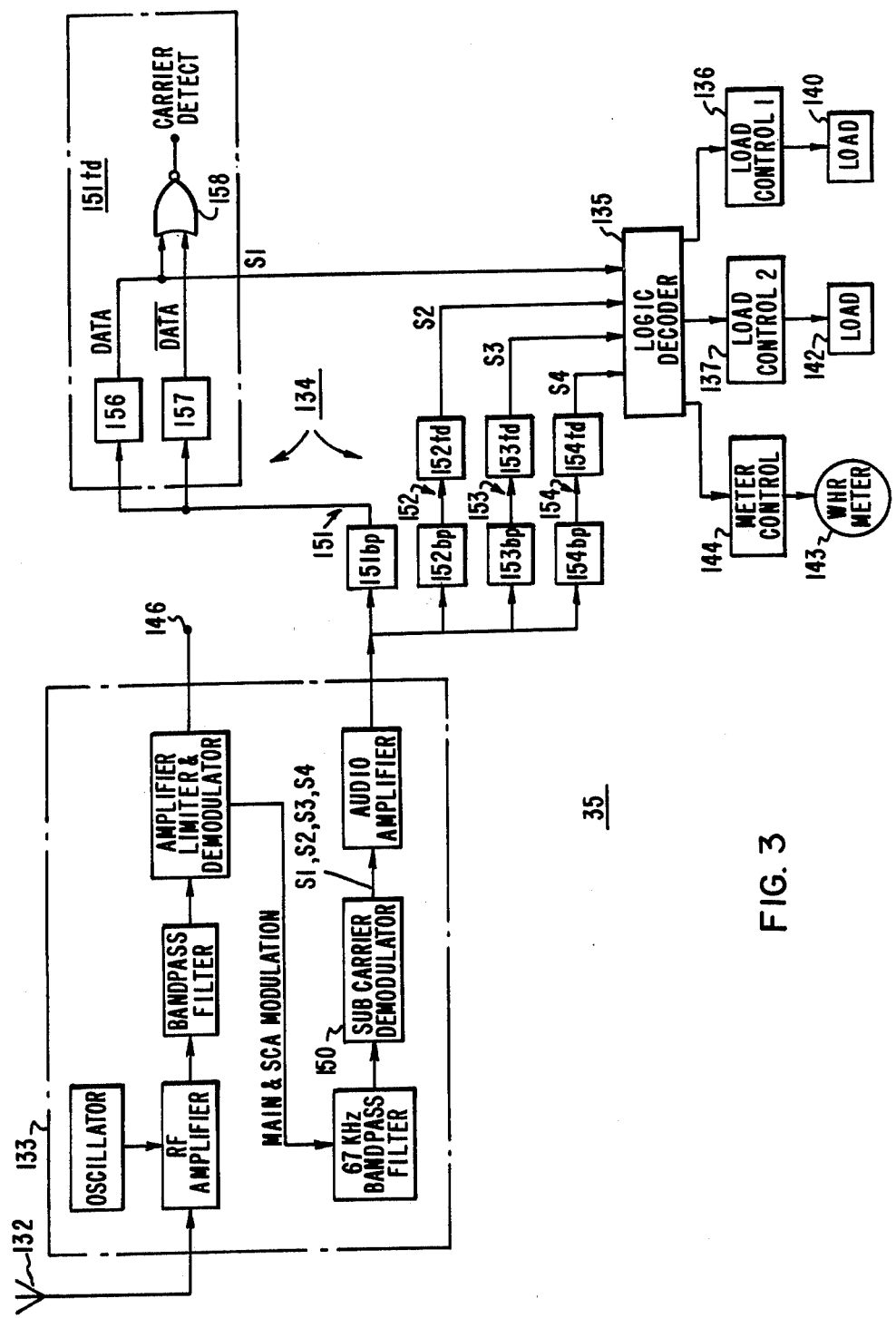
FIG. 3 is a block schematic diagram of a typical energy management terminal including an exemplary receiver as provided at the remote locations of electric power customers illustrated in FIG. 2B.

Referring now to FIG. 3, there is shown the remote local energy management terminal 35, which is described by way of example, for one of the customer remote locations shown in FIG. 2B. The receiver 133 is connected to an antenna 134 for receiving the VHF-FM broadcast transmitter signals from the transmitter antenna 52. The outputs of the receiver 133 are applied to a channel frequency selector net work 134 to separate the different signaling channels to develop the different data signals for the command response circuits of the terminal 35. The terminal 35 is a modified form of the terminal described in the aforementioned Pat. No. 4,130,874 and further described in connection with descriptions of FIGS. 4A and 4B. The terminal 35 as described in the aforementioned application includes logic decoder circuit 135 and load control circuits 136 and 137 for controlling a plurality of customer loads, such as loads 140, 142, which are exemplary of customer loads such as electric heating and air conditioning devices, respectively, which may be ones which are substantial electric energy consuming devices. A kilowatthour meter 143 and associated control circuit arrangement 144, which may be, as mentioned hereinabove, capable of recording and storing kilowatthours on a time of day basis for recording electric energy consumption on a time related basis. Thus, the local control circuits 136 and 137 and the metering control circuit 144 form electric energy usage related control functions in the terminal 35 as does the portion thereof included in terminal 35a.

The receiver 133 may include an FM/SCA tuner type TR-55D, available from the aforementioned McMartin Industries, Inc., Omaha, Nebr. 68127. In the McMartin data sheet dated 6/77 for the TR-55D, the conventional components thereof are shown in the blocks within the receiver circuit block designated 133. The output 146 thereof is intended for the normal FM-FM stereo audio output. The outpt of the subcarrier demodulator 150 produces the FSK two-tone data frequency signals transmitted in the signaling channels CH1, CH2, CH3 and CH4, for example, the two-tone frequencies f1-f2, f3-f4, f5-f6 and f7 and f8, intended for the particular remote terminal so as to only receive the base-band data signals S1, S2, S3 and S4 indicated for the group 17 in FIG. 2. One of the primary objectives of the present invention is to provide separate ones of the receivers in the communication terminals of the customer locations which are responsive to only preselected ones of the multitone signals and associated data signals to thereby permit addressing different groups of customer remote locations by simply sending the signals over a separate one of the signaling channels. In this manner, the signals S1 through S6 may be assignable to the different groups of remote locations as indicated in FIG. 2B. This will become more apparent with further description of the receiver circuits shown in FIG. 3.

The signaling channel frequencies are separated in the channel frequency selector network 134 of the receiver so as to define four receiving channels 151, 152, 153 and 154 corresponding to the transmitting signaling channels 81, 82, 83 and 84 included in signaling channels CH1 through CH4, respectively, including the base-band data signals S1, S2, S3 and S4. Each of the receiver signaling channels 151 through 154 include filters 151bp, 152bp, 153bp and 154bp, respectively, each having a frequency bandpass characteristic as shown in FIG. 5 and described for the filters 81bp through 84bp shown in FIG. 2A. These filters separate each of the FSK modulated signaling channels. The outputs of each of the filters is applied to separate tone detectors 151td, 152td, 153td and 154td for demodulating the FSK signals and producing the base-band binary data signals as shown in the graph of the signals S1, S2, S3 and S4 in FIG. 6. The tone detectors are formed by a type SE/NE 567 tone decoder phase locked loop available from Signetics Corporation, Sunnyvale, Calif. 94086. The tone decoder is described in the pages 229 through 238 of the Signetics Linear Data Book Volume I, dated 1972. The tone detector 151td illustrates a dual-tone decoder utilizing two of the aforementioned tone decoders, designated 156 and 157 and a NOR gate 158 as described in the Signetics Corp. publication. The DATA output provides the reconstituted binary data signal S1 applied to the channel 81 of the transmitter. The carrier detect (CD) output is produced at the gate 158 for initializing logic decoder circuit 135 of the terminal 35. Similarly, the binary base-band data signals S2, S3 and S4 are provided at the outputs of the tone detectors 152td, 153td and 154td, respectively, to the logic decoder circuit 135.

The use of multitone or two tone signals enable more reliable detection of the signals over that if single frequency tones were sent in each channel either continuously or in bursts. The carrier detect (CD) output is only produced when both of the two tone signals are received to authenticate receipt of a multitone signal. The above described tone detectors are capable of producing a DC voltage level in response to a single frequency tone signal within the bandwidths of the signaling channels in simple receiver arrangements for simpler terminal receiver operation.

Figure 4A:
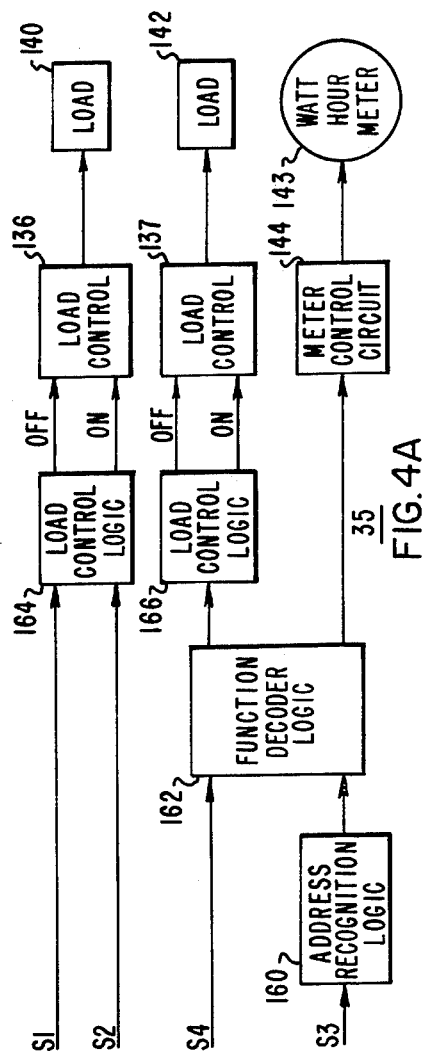
FIG. 4A is a block diagram of an energy management terminal used at some customer locations shown in FIG. 2B.
Figure 4B:
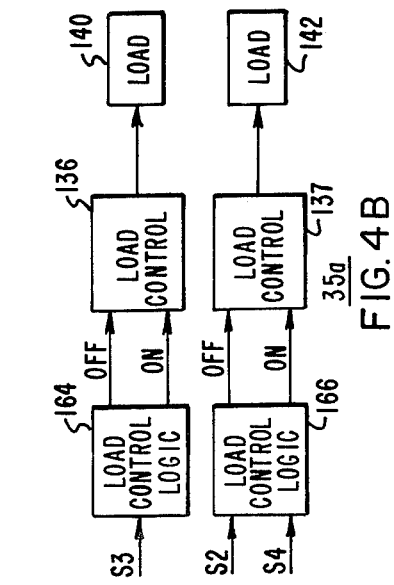
FIG. 4B is a block diagram of an energy management terminal including only a portion of the terminal shown in FIG. 4A and used at other customer locations.

FIGS. 4A and 4B illustrate block diagrams of portions of management terminals 35 and 35a including the logic decoder circuit 135 of the remote terminal which is described more thoroughly in the above-identified U.S. Pat. No. 4,130,874. FIG. 4B is a block diagram of a portion of FIG. 4A. The logic decoder circuit described in the aforementioned application includes a plural address recognition circuit 160 which is operable to distinguish encoded data signals having universal block address, selected block address unique address assigned to each customer location. The present invention avoids or substantially reduces the use of such an address recognition circuit 160 especially for universal and selected block addresses; however, one channel, such as S3, may be provided to the circuit 160 for unique addressing, if desired.

A function decoder logic circuit 162 is further included in the logic decoder circuit 135 and the thirty-two bit code format may be processed by the remote terminal 35 as disclosed in the aforementioned application, to effect various control functions in response to the corresponding command function included in a binary coded form in the transmitted data signal. The circuit 162 is also not required in simpler forms of the energy management terminals, but may be included so that signals S3 or S4 detected in the receive channels 153 or 154 of the receiver do not require an address code, but may include different function codes to provide a simpler mode of signaling without an address code.

Separate load control logic circuits 164 and 166 are described in the aforementioned application which are responsive to the unique address or the selected block address for effecting control of the load control circuits 136 and 137 for controlling the aforementioned loads 140 and 142. Since the tone signals carrying data signals S1 and S2 are frequency detected in received signaling channels 151 and 152, no address code is required and the signals directly actuate the load controlling circuits. The circuits 162, 164 and 166 generally define command response portions of the logic decoder 135. Alternatively, the multitone signals carrying data signals S3 and S4 may be applied to tone detectors of another terminal in which these signals are applied directly to the load control logics 164 and 166 without having the coded portions thereof decoded as shown in FIG. 4B. Thus, the presence of the tone signals at a terminal receiver capable of frequency detecting the multitone signals having data signals S3 and S4 directly provides the predetermined command response. A single multitone signal such as S3 or S4 is capable of conveying different information to different remote management terminals either by their presence or coded information content.

The alternate voltage levels of data signal S2 can be used along with signal S4 to turn off air conditioner loads 142 in one group while used to return the heater loads in another group having terminals 35 to the on condition. Thus, the same signal S2 effects different control functions.

A further function provided in the remote terminal is to control a watthour meter control circuit 144 shown in FIG. 4A which receives an input from an electronic meter encoder for producing coded electronic signals indicating the electric power consumption. Meter reading interrogation commands may be included in the function codes for return transmission by an alternate communications link. Also, meter readings may be stored in response to function codes in a meter data storage, provided in the circuit 144 and referred to in the aforementioned application, which stores the meter reading data on a different time of day basis. A further addressed electric energy usage related function to be controlled is referred to in the aforementioned U.S. Pat. No. 4,128,807 in which different dials of a multi-dial electric meter are remotely activated for totalizing the electric energy consumption or power demand during predetermined time periods each day. A solenoid is described which is actuated remotely and such a solenoid may be included in the circuit 144.

In accordance with a principal feature of the present invention, the data signals transmitted from the master station via the multipurpose, multitone signals which are intended primarily for communicating with customer remote locations to effect a predetermined control or command function without complex address decoding or function decoding circuitry being required at the remote terminal or, alternatively, to simplify data transmissions by only requiring either of addressing or function decoding. The signal S1 may be optionally defined as a signal intended to be transmitted to all customer remote locations in groups 17, 19 and 21 to effect turn-off of a load. This corresponds to a universal block address function. Accordingly, the receiver at each location operating in the matter described for the receiver 133 detects the signal S1 at the tone detector 151td connected in the dual-tone decoder arrangement shown on page 237 of the aforementioned Signetics Linear Data Book, Volume I, so that a data output is provided by the binary base-band coded signals S1 and a carrier detect CD output is provided from the tone detectors at each receiver, as shown in FIGS. 3 and 4A. The signal S1 is a serial stream of binary ones and zeros applied directly to a load control logic circuit 164 to activate a load disconnect device in the load control circuit 136 to deenergize a load 140 at each remote location. Such a load disconnect device may be provided as disclosed in U.S. Pat. application Ser. No. 878,857, filed Feb. 17, 1978 and assigned to the assignee of this invention. Accordingly, in an emergency situation wherein a power line distribution network is subject to an actual or imminent overload condition, the electric loads may be simply and effectively disconnected from the network 12 by simply sending the two-tone signals of the signaling channel CH1 including the frequency signals f1-f2 to several groups such as 17, 19, 25 and 27 or all the groups. The data signals S2 may be used to return the load 140 to an ON condition by applying signals over the signaling channel having the frequency signals f3-f4 to the load control logic circuit 164, shown in FIG. 4A. Alternatively, the signaling channels including data signals S1 and S2 may be connected to directly control the watthour meter control circuit 144.

The data signals S3 may be encoded with the same format as described in the aforementioned application, having both address and function codes, as shown in FIG. 6. The signals S4, S5 and S6 are encoded with function codes only to effect predetermined different addressed electric energy usage related responses at preselected remote locations as indicated in FIG. 2B. Signal S4 is selected to be receivable by each of the customer remote locations in the selected block address category 17. These signals may include different function codes so that data over the communication system 10 will only effect different desired responses at the homes or remote locations in the group 17. The data signal S5 is selected to be received only at group 19. Signals S4 or S5 may be applied directly to the function decoder logic circuit 162 of each associated remote management terminal so that the data signals S4 and S5 do not require an address code format. This feature provides flexibility in signaling a desired command or response function to be performed while not requiring addressing for signaling exclusively the customer remote groups 17 or 19. Accordingly, the transmitted data signals S5 may be received in the signaling channel having frequency signals f9-f10 only at the remote group 19, in which case, the associated terminal receivers are responsive for receiving the tone signal frequencies f9-f10, but not tone signal frequencies f7-f8 which are detected only at the associated terminal receivers in group 17. These signals S4 and S5 selectively operate desired equipment at different groups or subgeographical remote locations without the use of an address coding format. Thus, it is seen that the data signals S1, S2, S4 and S5 provide signaling by the first two S1 and S2 at a universal block address of plural groups of remote locations or all locations, which would include all of the customer locations and separately signaling by the latter two signals S4 and S5 at selected block addresses of the two groups 17 and 19 of customer remote locations since they are separately responsive to different signaling channels CH4 and CH5.

The remote terminals in group 21 may have a receiver to detect the multitone signals carrying data signals S2, S3 and S4 and command response circuit in terminal 35b as shown in FIG. 4B. Thus, the coded address and/or function of signal S3 and coded function information signal S4 may be decoded in the groups 17 or 19 by the arrangement shown in FIG. 4A while simpler terminals 35b at group 21 respond to only the presence of signals S3 and S4. The signal S2 can also control air conditioner loads 142 in group 21 and heater loads 140 in groups 17 and 19.

The data signals S6 shown in FIG. 2A represent those signals which may be exclusively transmitted in the associated multitone signals via the transmitter signals 53 from the master broadcast station 36 for detection and decoding or immediate retransmission in the satellite broadcast station 54 shown in FIG. 2B having a receiver 68 arranged with predetermined tone detectors, as described hereinabove in connection with FIG. 3. The detector and control logic 70 is effective to detect the signaling channels having the frequency signals f1-f2, f3-f4 and f11-f12, for purposes of illustrating this invention and not limitation, so as to demodulate the binary base-band data signals S1, S2 and S6. The signals S1, S2 and S6 are tone modulated at the same or different tone frequencies to be transferred to the SCA modulator 70 for relaying from the antenna 62 and the customer remote locations in the designated group categories 25 and 27. The satellite broadcast station can include a function decoder logic circuit, not shown, such as described for the remote terminal shown in FIG. 3 which is effective to produce a prearranged coded signal from a preselected signaling channel. A source of pre-programmed data signals, not shown, may be further provided, such as the source 78 described for the master broadcast station 36, which is activated by the prearranged coded signals to produce predetermined data signals for transmission over plural signaling channels from the satellite station 54. In the latter instance the signal S6 would activate the source of data signals at the station 54 for initiating their transmission to the groups 25 and 27.

While a preferred embodiment of the present invention has been disclosed hereinabove and alternative modes of operation have been described, it is contemplated that equivalent and modified embodiments of this invention may be made by those skilled in the art, without departing from the spirit and scope of this invention, which is set forth in the following claims.

We claim:

1. A radio communication system for automated control of an electric power distribution network supplying electric energy to customer remote locations defining at least first, second and third predetermined groups of remote locations with each group being separately designated by different selected block addresses and wherein said remote locations within at least said first and second groups are designated by a common universal block address, said radio communication system comprising:

master and satellite commercial VHF-FM broadcast signal transmitting means producing electromagnetic radiations, said radiations from said master transmitting means being receivable by said first and said second groups of said remote locations and said radiations from said satellite transmitting means being receivable by said third group of said remote locations, each of said master and satellite transmitting means including a first FM carrier modulator means for modulating the electromagnetic radiations thereof with information included in a composite broadcast station channel including a broadcast program main channel having both monaural and stereo channels and an SCA auxiliary channel, each of said master and satellite transmitting means further including tone modulator means for producing plural pairs of frequency shift key modulated two tone signals in different frequency spaced signaling channels and still further including second FM carrier modulator means including a subcarrier included in said SCA auxiliary channel thereof and modulating said subcarrier with said pairs of two tone signals;

a source of plural data signals each designating preselected energy usage related command information wherein said plural data signals have either of first and second data signal formats with said first signal format including a predetermined binary coded format having a fixed number of bit intervals and with said second signal format including a continuous bit stream, said plural data signals being received by said tone modulator means of said master transmitting means for producing each of said plurality of pairs of two tone signals in response to separate ones of said plural data signals so as to define corresponding separate ones of said signaling channels;

said satellite transmitting means including radio receiver means receiving said radiations of said master transmitting means and being responsive to at least one of said signaling channels having a data signal responsive to the pair of two tone signals transmitted therein and having the tone modulator means and second FM carrier modulator means thereof responsive to the output of said receiver means for modulating said subcarrier frequency of the SCA auxiliary channel thereof with the received data signals for retransmission to said third group of said remote locations;

plural energy management terminals each located at a separate one of said customer remote locations, said terminals each including control means having energy usage related control functions, said terminals further including receiver means and tone detector means selectively responsive to predetermined ones of said signaling channels in the received one of said electromagnetic radiations of said master and satellite transmitting means, said terminals of said first group of remote locations including logic circuit means responsive to the detector means thereof when receiving at least one signaling channel including a data signal having said first signal format to activate the control means thereof, said terminals of said second group of remote locations having the control means thereof activated by the output of the detector means thereof in response to the presence of another of said signaling channels including a data signal having said second signal format, said terminals of said first and second groups of said remote locations including said common universal block address having the detector means thereof being commonly responsive to still another of said signaling channels including a data signal having said second format for concurrently activating said control means of each terminal therein, and said terminals of said third group of remote locations having the detector means thereof being responsive to a further one of said signaling channels including a data signal with one of said first and second signal formats and being retransmitted by said satellite transmitting means for activating said control means thereof.

2. A radio communication system as claimed in claim 1 wherein said third group of remote locations include said energy management terminals being designated by said common universal block address of said first and second groups of remote locations and being responsive to said still another of said signaling channels in common with both said first and second groups, said last named terminals being further responsive to said another signaling channel in common with only said second group, and being still further responsive to said further one of said signaling channels exclusive of the signaling channel responses of said terminals at said first and second groups.

3. A radio communication system as claimed in claim 1 wherein said control means of said energy management terminals include two different load controlling functions and wherein said still another signaling channel produces said data signal having said second format concurrently at said terminals of said first and second groups of remote locations effective to activate one load control function at said first group and the other load control function at said second group.

4. A radio communication system as claimed in claim 3 wherein one of said two different load controlling functions is effective to switch an associated electric load from an off to an on condition at said first group of remote locations and the other of said two load controlling functions is effective to concurrently switch an associated electric load from an on to an off condition, respectively, at said second group of remote locations.

5. A radio communication system as claimed in claim 3 wherein said still another signaling channel produces said common data signal to be applied to said control means at the management terminals of said first group of remote locations so as to switch electric heater devices at said first group of remote locations between connected and disconnected states with said distribution network, and for said data signal to be applied to said control means at the management terminals of said second group of remote locations so as to switch electric air conditioner devices thereat between connected and disconnected states with said distribution network.

6. A radio communication system as claimed in claim 1 wherein said plural data signals include one data signal having a predetermined data bit rate and said tone modulator means produces a single pair of two tone signals having each of said pair of two tone frequencies alternately occurring in response to the two binary levels occurring at said data bit rate of said one data signal with each of the pair of two tone frequencies being harmonically related to each other and to the predetermined data rate.

7. A radio communication system as claimed in claim 1 wherein one of said master and satellite transmitting means includes a stored source of said data signals designating preprogrammed energy usage related command functions with said stored source of data signals being activated for receipt by said tone modulator means thereof in response to a remote command signal.

8. A radio communication system for automated control of an electric power distribution network supplying electric energy to customer remote locations, said radio communication system comprising:

commercial VHF-FM broadcast signal transmitting means producing electromagnetic radiations extending to said remote locations;

first modulation means for modulating the transmitted broadcast signal with information included in a composite broadcast channel including both a broadcast station program main channel and an SCA auxiliary channel;

a source of binary data signals designating energy usage related command functions, said data signals varying between two binary levels at a rate defining a predetermined data bit rate with said data signals including either of two signal formats wherein a first signal format includes a predetermined number of data bits with at a portion thereof having a function code and a second signal format includes a continuous bit stream;

second modulation means for producing a pair of two tone signals having frequencies harmonically related to each other and to said predetermined data bit rate when produced to shift between the two tone signals in response to changes between the two levels of one of said data signals, said second modulation means including means for phase synchronizing the transitions occurring in the shifts between each of said pair of two tone frequencies in response to changes in the two levels of said one data signal;

third modulation means including a subcarrier included in said auxiliary channel with said subcarrier having a predetermined frequency wherein the subcarrier frequency is harmonically related to both the frequency values of said two tone signals of said one data signal, said third modulation means modulating said subcarrier with said pair of two tone signals of said second modulation means, the output of said third modulation means being applied to said first modulation means for modulating the information of said auxiliary channel on said transmitted broadcast signal; and energy management terminal means located at said customer remote locations and including radio receiver means receiving said electromagnetic radiations, two tone detector means for detecting said one binary data signal, and control means having an energy usage related control function at an associated remote location with said control means being activated by said one of said data signals.

9. A radio communication system as claimed in claim 8 wherein said second modulation means includes a clock frequency source and first and second divider circuits responsive to signals produced by said clock frequency source to generate said pair of two tone signals at the outputs of said first and second divider circuits, and solid state switch means having two signal inputs separately receiving said pair of two tone signals, a signal output alternately connected to said inputs and further having a control input being operative in response to the two levels of said one data signal to alternately produce said two tone signals at the signal output thereof so that the end of one of the pair of tone signals has the same phase as the beginning of the other of the pair of tone signals to produce phased synchronized transitions between said pair of two tone signals at the output of said second modulation means.

10. A radio communication system as claimed in claim 9 wherein said second modulation means includes means producing pulses at a rate equal to said predetermined data bit rate in response to signals produced from said clock frequency source at a predetermined frequency divided value thereof and further includes circuit means for receiving said pulses and said one data signal and sequentially applying the level corresponding to the binary state of each bit of said one data signal to said control input of said solid state switch means at the rate of said pulses.

* * * * *